United States Patent
Talbert et al.

(10) Patent No.: US 10,645,617 B2
(45) Date of Patent: May 5, 2020

(54) SYSTEMS AND METHODS FOR HYBRID MANAGEMENT OF AN IN-PREMISES NETWORK

(71) Applicant: Verizon Patent and Licensing Inc., Arlington, VA (US)

(72) Inventors: Michael Talbert, Nazareth, PA (US); Meaghan Leong, Cohasset, MA (US); Christina L. Fyock, Sudbury, MA (US); Aldrich Gamboa, Bridgewater, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 87 days.

(21) Appl. No.: 16/109,086

(22) Filed: Aug. 22, 2018

(65) Prior Publication Data
US 2020/0068440 A1  Feb. 27, 2020

(51) Int. Cl.
| | |
|---|---|
| H04L 12/26 | (2006.01) |
| H04W 28/16 | (2009.01) |
| H04W 28/02 | (2009.01) |
| H04W 48/06 | (2009.01) |
| H04W 76/36 | (2018.01) |
| H04W 72/10 | (2009.01) |
| H04W 8/22 | (2009.01) |
| H04W 72/08 | (2009.01) |
| H04W 84/12 | (2009.01) |
| H04L 12/28 | (2006.01) |

(52) U.S. Cl.
CPC ........ *H04W 28/16* (2013.01); *H04L 43/0876* (2013.01); *H04W 8/22* (2013.01); *H04W 28/0231* (2013.01); *H04W 48/06* (2013.01); *H04W 72/08* (2013.01); *H04W 72/10* (2013.01); *H04W 76/36* (2018.02); *H04L 12/2803* (2013.01); *H04W 84/12* (2013.01)

(58) Field of Classification Search
None
See application file for complete search history.

(56) References Cited

U.S. PATENT DOCUMENTS

| | | | | |
|---|---|---|---|---|
| 6,636,737 | B1 * | 10/2003 | Hills | H04W 28/26 370/338 |
| 2012/0099428 | A1 * | 4/2012 | Kamdar | H04L 41/5022 370/235 |

\* cited by examiner

*Primary Examiner* — Kouroush Mohebbi

(57) ABSTRACT

A system may include a management platform. The system may include a master system hosted by a first subscriber device that is communicatively coupled to the management platform over an external network. The system may include an agent system hosted by a second subscriber device that is communicatively coupled to the first subscriber device, and to an end-user device, over a WLAN. The agent system may be configured to cause the second subscriber device to output information regarding the end-user device. The management platform may be configured to cause one or more processors, of the management platform, to identify, based on the information, an insufficiency in network resource capacity, associated with the WLAN, for the end-user device, and provide one or more commands to the master system to cause the master system to perform an action to address the insufficiency.

20 Claims, 10 Drawing Sheets

SYSTEMS AND METHODS FOR HYBRID MANAGEMENT OF AN IN-PREMISES NETWORK

BACKGROUND

People are using an increasing number of Wi-Fi-enabled devices in the premises (e.g., the household), including, laptops, tablets, cell phones, smart televisions, gaming systems, video streaming devices, and/or the like. The smart home market is also taking advantage of the popularity, and ubiquity, of Wi-Fi by offering more Wi-Fi-enabled devices, such as thermostats, doorbells, cameras, digital assistants, and/or the like.

DETAILED DESCRIPTION OF PREFERRED EMBODIMENTS

Figure 1A:
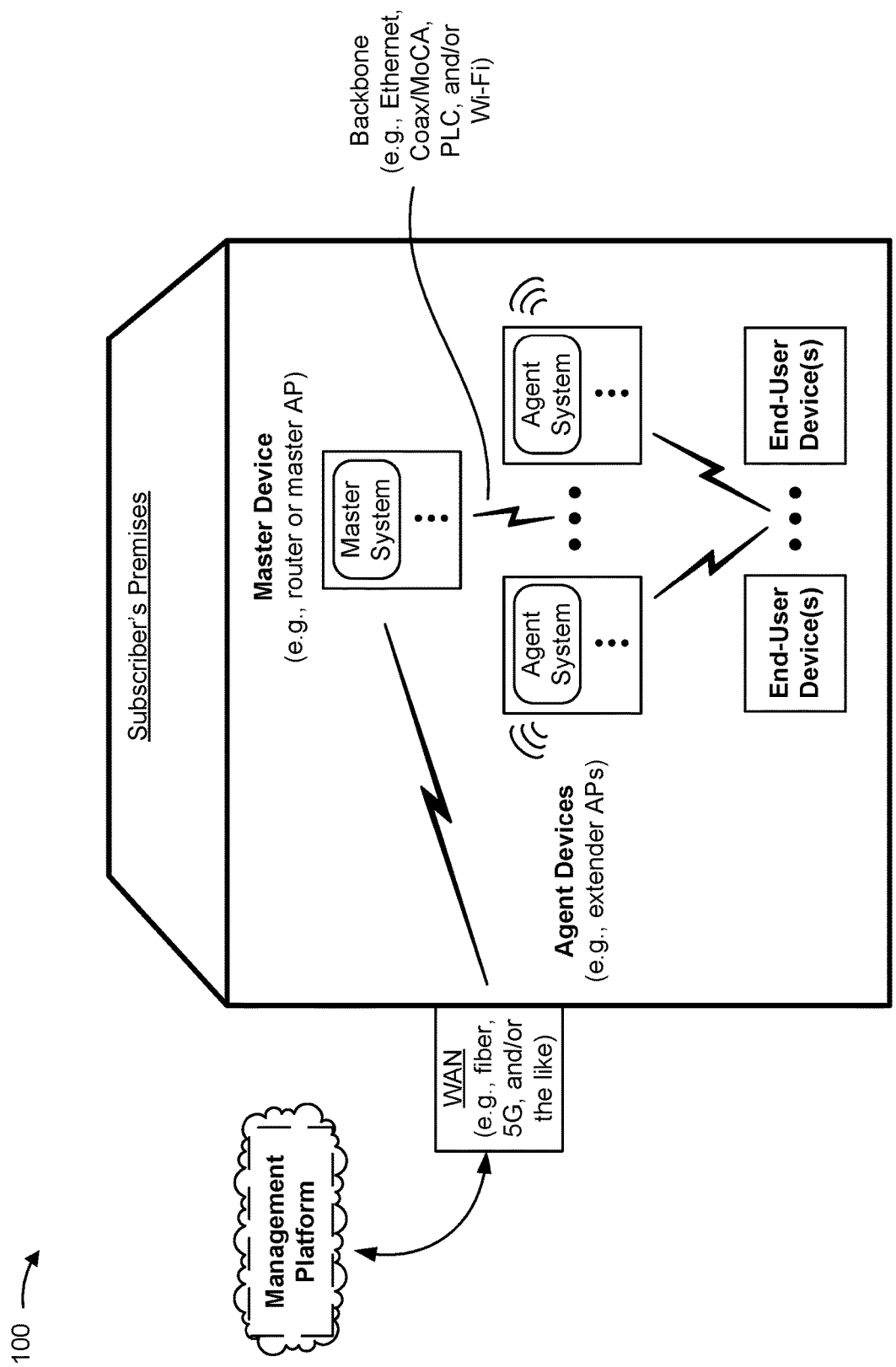
FIGS. 1A-1E are diagrams of an example implementation described herein.

The following detailed description of example implementations refers to the accompanying drawings. The same reference numbers in different drawings may identify the same or similar elements.

Operating a large number of devices on a Wi-Fi network can place a drain on network resources. For example, simultaneously streaming high definition videos on some devices and engaging in online gaming on other devices may increase overall network latency. This leads to poor network performance as well as user frustration. In addition, in many subscribers' premises, there is often a lack of Wi-Fi coverage in areas farther from a router or Wi-Fi extender, which can also negatively impact user experience. Existing multi-access point systems, with mesh technology, do not fully address these issues, since such systems lack advanced management and orchestration of end-user devices on the network, and lack the needed throughput to cater to premises where there is high Wi-Fi consumption.

Some implementations, described herein, provide a network and resource management system (e.g., a hybrid, self-organizing, self-healing, and self-optimizing network system) that is capable of providing advanced management and dynamic orchestration of end-user devices on an in-premises network (e.g., a wireless local area network (WLAN), such as a Wi-Fi network). In some implementations, the network and resource management system may include a management platform (e.g., implemented in a cloud computing environment), a master system (e.g., hosted by a master device (e.g., a subscriber device, such as a router or a master access point (AP))), and one or more agent systems (e.g., individually hosted by one or more agent devices (e.g., other subscriber devices, such as extender APs)) that provide hybrid (e.g., remote and local) management of an in-premises network. In some implementations, various functions of the network and resource management system may be provided as an add-on service (e.g., a microservice). For example, the master system and/or the agent systems may be deployed to, and hosted by, the associated devices in the form of add-on service applications.

In some implementations, the network and resource management system may provide an end-to-end self-optimizing network (SON) solution that is device-based and service-based. For example, the network and resource management system may be capable of distributing and/or allocating resources to an end-user device (e.g., including by steering the end-user device to the most appropriate access point on an in-premises network so as to enforce Quality of Experience (QoE) throughput) based on a device type of the end-user device, a service level agreement (SLA) profile associated with the end-user device, and/or a type of service application that is being executed by the end-user device.

In some implementations, the network and resource management system may be capable of managing an in-premises network based on network resource usage patterns. For example, the management platform may (e.g., based on parametric data associated with agent devices and/or end-user devices) utilize advanced analytics to identify network resource usage patterns and/or trends (e.g., usage of network resources based on time of day, day of week, day of month, season (e.g., Fall, Winter, Spring, Summer), events (e.g., live events, such as sports events, Olympic events, news events, championship events, election events, etc.), and/or the like) over time, and manage the overall in-premises network (e.g., including via load balancing and/or the like) based on such network resource usage patterns and/or trends.

Providing end-to-end access point, and device, management throughout a subscriber's in-premises network (e.g., including via device steering and/or load balancing), based on device type, service applications being executed, and/or the like, optimizes device-to-device connections, which improves overall network performance and reliability. Learning of network resource usage patterns, based on parametric data collected over time, also enables continual adjustments to be made to further optimize network performance (e.g., as device behavior changes). Parametric data analyses also allow a network service provider to identify network-related issues, and take appropriate action(s)—including, for example, notifying an affected subscriber and/or technical support teams—to address the issues, which enables more efficient issue resolution and improves overall service reliability.

FIGS. 1A-1E are diagrams of an example implementation 100 described herein. FIG. 1A is a diagram of a high-level architecture of an example network and resource management system. As shown in FIG. 1A, the network and resource management system may include a management platform (e.g., a cloud-based platform, a non-cloud-based platform, a hybrid platform that is partially cloud-based and partially non-cloud-based, and/or the like), a master system hosted by a master device (e.g., a customer premises equipment or subscriber device, such as a router or a master access point), and one or more agent systems hosted by respective agent devices (e.g., customer premises equipment or subscriber devices, such as extender access points located throughout a subscriber's premises). As further shown, the master device may be communicatively coupled to the management platform over an external network (e.g., a wide area network (WAN)), and may be communicatively coupled to the one or more agent devices over an in-premises network (e.g., a WLAN, such as a Wi-Fi network). In some implementations, each agent system may be configured to communicate with the master system over a control plane and/or a management plane (e.g., via a wired connection and/or a wireless connection). As further shown, multiple end-user devices may be communicatively coupled to the agent devices to gain access to the external network. As further shown, the in-premises network may support various logical backbones, including, for example, an Ethernet backbone, a Coax/MoCA backbone, a power-line communication (PLC) backbone, a Wi-Fi backbone, and/or the like.

In some implementations, the network and resource management system may provide service level agreement (SLA) enforcement—e.g., at the access point level and the end-user device level—across the in-premises network, based on data relating to devices (e.g., the master device, all the agent devices, and/or all the end-user devices) on the in-premises network. For example, as described in more detail below, the management platform may, in conjunction with the master system and the one or more agent systems, obtain and/or generate data, analyze the data, and perform actions, based on analyzing the data, to ensure that the in-premises network performs at a peak level (e.g., within thresholds specified in SLA profiles associated with the agent device(s) and/or the end-user devices).

In some implementations, an agent system, hosted by an agent device, may be configured to monitor (e.g., periodically, continuously, based on user input, and/or the like) connectivity between the agent device and one or more of the end-user devices, obtain and/or generate data based on the monitoring, and provide the data to the master system for analysis and/or processing. In some implementations, the data may include device information and/or parametric data (e.g., regarding the agent device and/or the end-user device(s)), statistical data based on the device information and/or parametric data, information identifying service applications (e.g., executing in the end-user device(s)), and/or the like.

For example, the data may include information that identifies a device type, a device address (e.g., a media access control (MAC) address, an Internet Protocol (IP) address, and/or the like), blacklisted end-user devices, a state of a device (such as an on state, an off state, a sleep state, a power save state, and/or the like), a minimum rate needed for a service, a prioritization level for an end-user device, a basic service set identifier, a modulation and coding scheme (MCS) index value, a service set identifier (SSID), a physical layer (PHY), a received signal strength indicator (RSSI), a noise level, packet loss, device throughput, a quantity of error packets, latency, jitter, data consumption, a channel band, channel utilization, channel interference, airtime requirements and/or availability, device capabilities, roaming properties, device inventory, operation modes (such as 802.11b/g/n/ac/ad and/or the like), a channel bandwidth size, a quantity of end-user devices communicatively coupled to an agent device, a quantity of end-user devices communicating over a channel band of an agent device, and/or the like.

As another example, the data may include information regarding device classification and/or device needs, such as critical-level needs (e.g., for devices, such as medical devices, security devices, and/or the like, that need constant connectivity), high-level needs (e.g., for devices associated with high-availability services), and/or the like (e.g., set by default or customized by a subscriber).

As a further example, the data may include information regarding service classification, such as essential services (e.g., associated with a smart thermometer, a smart door lock, a smart premise alarm system, a smart camera, a smart TV, a carbon monoxide sensor, a smart smoke detector, and/or the like), high-priority application services (e.g., associated with downstream video, upstream video, voice-over-IP (VOIP), videoconferencing, real-time gaming, and/or the like), medium-priority application services (e.g., relating to a smart light, a digital assistant, and/or the like), low-priority application services (e.g., associated with a fitness band, a smart coffee maker, and/or the like), and/or the like (e.g., set by default or customized by a subscriber).

As described above, the network and resource management system may optimize the performance of an in-premises network based on SLA profiles. In some implementations, each device on the in-premises network (e.g., each end-user device, each agent device, and the master device) may be associated with an SLA profile. In some implementations, an SLA profile may include thresholds, such as key performance indicator (KPI) thresholds relating to some or all of the data described above (e.g., the parametric data). For example, an SLA profile may include KPI thresholds relating to RSSI, latency, throughput, packet loss, airtime, and/or the like.

In some implementations, an agent system may include autonomous functionality. For example, in some implementations, an agent system may be capable of facilitating seamless device handoff of end-user devices, and load balancing, between agent devices on an in-premises network, without intervention by a master system. As another example, an agent system may be capable of managing power resources of the agent device in which the agent system is hosted. For example, an agent system may be capable of automatically determining (e.g., based on incoming traffic and/or outgoing traffic) whether any end-user devices are communicating with the agent device, and controlling a power mode of the agent device based on a result of the determination. Continuing with the example, the agent system may be configured to switch the agent device to a power-save mode if no end-user devices are communicating with the agent device. This conserves power resources of the agent device, and provides for a more economically-friendly network.

In some implementations, the master system may be configured to manage (e.g., locally manage) an in-premises network to ensure that each end-user device has sufficient network resources for service delivery. In some implementations, the master system may be configured to perform analytics, monitor the overall health of the in-premises network and the Quality of Service (QoS) of wired devices and wireless devices on the in-premises network, and/or perform network optimizations (e.g., by load balancing network traffic). For example, the master system may be configured to locally analyze data (e.g., the above-described data, such as device information, parametric data, information identifying service applications, and/or the like, provided by one or more agent systems), and perform (e.g., in real-time or near real-time) one or more actions, based on result(s) of the analysis, to control the agent device(s) and/or the end-user device(s) so as to optimize allocation of available network resources for optimal QoE. For example, the action(s) may include steering of an end-user device to a different channel band of an agent device (e.g., an access point) and/or to a different agent device (e.g., a different access point), performing load balancing, and/or the like. Additionally, or alternatively, the master system may provide the data to the management platform for analysis and/or processing (e.g., analysis and/or processing similar to that which the master system may be capable of performing and/or additional analysis and/or processing, as described in more detail below), and perform (e.g., in real-time or near real-time) one or more actions (e.g., to similarly control the agent device(s) and/or the end-user device(s)) based on corresponding commands provided by the management platform. In some implementations, the master system may be configured to provide updates to the management platform regarding any action(s) taken by the master system, which enables the management platform to identify, over time, whether certain actions provide more optimal results than other actions.

In some implementations, the master system may be configured to determine whether there exists connectivity between the master device and the management platform, and either provide the data to the management platform for analysis and/or processing based on determining that there exists connectivity between the master device and the management platform, or process the data locally (e.g., at the master device) based on determining that there lacks connectivity between the master device and the management platform. This enables uninterrupted network management, for example, in cases where connectivity between the master device and the management platform is lost or unstable (e.g., due to power outages).

In this way, the network and resource management system may provide hybrid (local and/or remote), dynamic management of an in-premises network infrastructure, including rapid identification of network-related issues and mitigation of negative impacts to network performance, based on analyzing device-related data.

In some implementations, the master system may be deployed in a container environment hosted by a master device. For example, the master system may be instantiated in a container of the container environment. In some implementations, various functions of the master system may be instantiated in micro-containers, or sub-containers, within the container. Containerization eliminates dependency of service applications, such as the master system, on an underlying operating system, which simplifies, and improves overall efficiency of, application development and deployment.

Figure 1B:
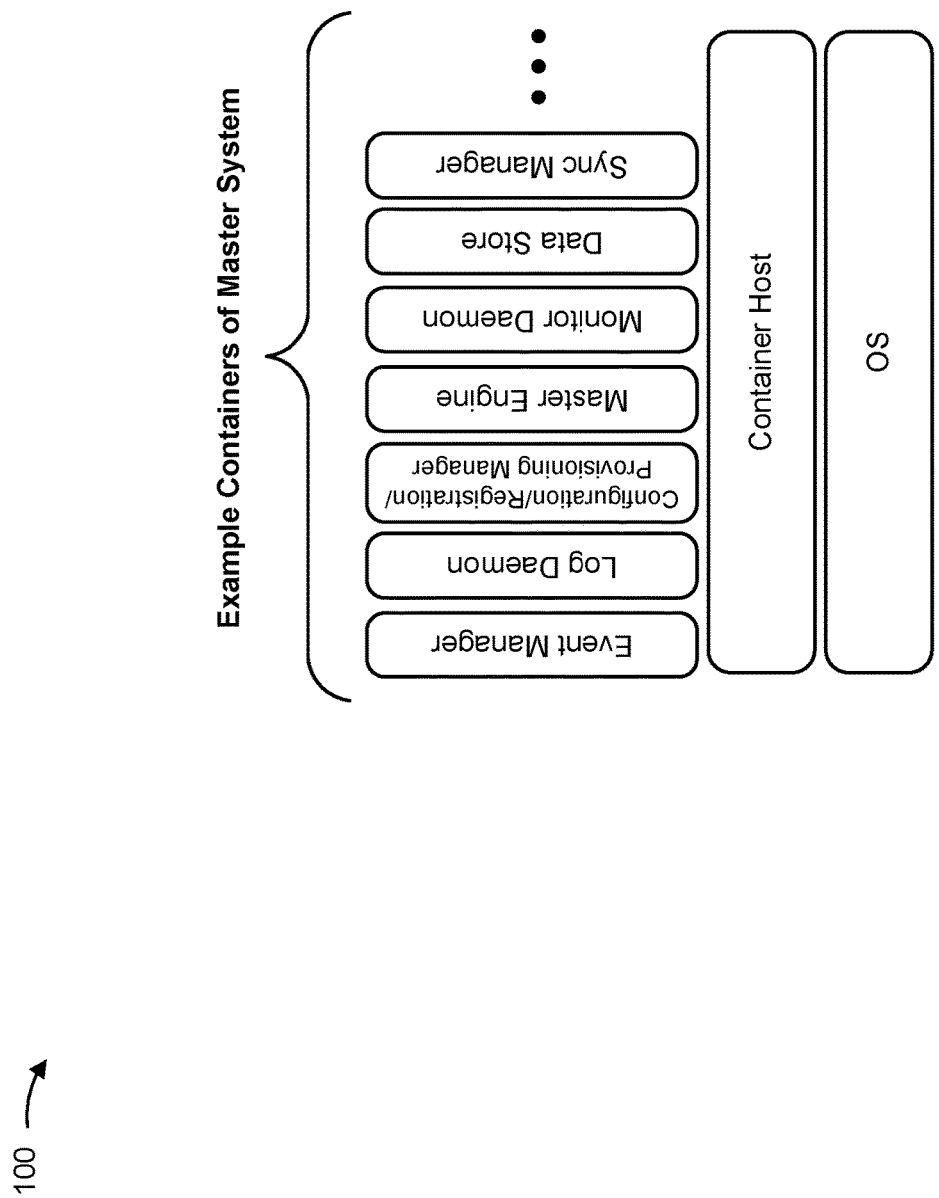

FIG. 1B is a diagram of an example control plane system architecture of a master system. In some implementations, the master system may execute, on one or more processors of a master device, as a collection of containers orchestrated on top of a container host (e.g., a virtualized abstraction layer). In some implementations, the container host may include a set of application programming interfaces (APIs) configured to abstract services, provided by an operating system kernel, from service applications instantiated in containers above the container host, and may facilitate interoperation between the containers.

As shown in FIG. 1B, the master system may include an event manager, a log daemon, a configuration/registration/provisioning manager, a master engine, a monitor daemon, a data store, and a sync manager. In some implementations, the master system may include other elements and/or components not shown in FIG. 1B. In some implementations, the event manager may be configured to receive event information from an agent system(s), such as notifications indicating that parametric data values satisfy (or do not satisfy) corresponding thresholds included in an SLA profile. In some implementations, the event manager may provide the event information to the master engine for analysis and/or processing.

In some implementations, the log daemon may be configured to obtain, from the agent system(s), log data relating to steering activity, association/disassociation activities, and/or the like. In some implementations, the log daemon may store the log data in the data store (e.g., non-volatile memory) for temporary storage. In some implementations, the log daemon may control the sync manager to sync the stored log data with the management platform (e.g., upon, or after, determining that a size of a corresponding log file satisfies a threshold size), clear the log data (e.g., upon, or after, a syncing process), and/or the like.

In some implementations, the configuration manager may be configured to receive commands from the management platform (e.g., policy information derived, and provided, by the management platform based on the management platform's analysis and/or processing of the log data), and provide the commands to the master engine. In some implementations, the configuration manager may be configured to set various values, such as a maximum file size, uniform resource locators (URLs) to be used by the master engine to communicate with the management platform, a time period for syncing, SLA profiles for various devices (e.g., including for managed devices, such as set top boxes and/or the like), and/or the like.

In some implementations, the master engine may be configured to analyze the above-described event information, and perform one or more actions, with respect to an in-premises network, based on the event information and KPI thresholds (e.g., included in SLA profile(s) associated with agent device(s) and/or end-user device(s) on the in-premises network). In some implementations, the action(s) may include providing control instructions to one or more agent devices, generating log data based on providing the control instructions, and/or the like. In some implementations, the master engine may be configured to perform similar actions based on commands (e.g., policy information) received from the management platform.

In some implementations, the monitor daemon may provide an interface that permits a user (e.g., a subscriber, a technical support specialist associated with a network service provider, and/or the like) to interact with, and/or access, the master system in real-time (or near real-time). This enables diagnostics of the master system, querying for in-premises network-related information, as well as other capabilities, such as providing of information to a subscriber (e.g., such as alerts and/or notifications described elsewhere herein, marketing information, new service or product offering information, and/or the like). In some implementations, the interface may include a user interface presented for display (e.g., on an end-user device and/or the like). In some implementations, the user interface may provide user-selectable options for a subscriber to set SLA profile values, including those relating to prioritization of certain end-user devices (e.g., work computers, streaming video devices, security cameras, and/or the like) over other end-user devices, prioritization of certain service applications (e.g., relating to medical services, security services, and/or the like) over other service applications, and/or the like.

In this way, the master system may be implemented in an environment that supports highly portable service applications, which permits flexible porting of the master system to different customer premises equipment processors (e.g., including future generations of processors).

As briefly described above, in some implementations, the management platform may be configured to receive data (e.g., device information, parametric data, and/or the like) from the master system, analyze and/or process the data to determine network resource-related adjustments and/or optimizations (e.g., including steering of an end-user device to a different channel band of an access point and/or to a different access point, performing load balancing between access points, and/or the like), and provide commands (e.g., policy information) to the master system to implement the adjustments and/or optimizations (e.g., via control of one or more agent systems). For example, the management platform may process the data by comparing the data and corresponding thresholds included in SLA profiles associated with the various devices on an in-premises network.

In some implementations, the management platform may be configured to perform long-term trend, and/or behavioral analyses on data received over time. Such analyses may include monitoring usage of network resources by a master device, agent device(s), and/or end-user device(s), and identifying network resource usage patterns associated with such devices (e.g., based on time of day, day of week, month of year, season of year, and/or the like). In some implementations, the management platform may determine network resource-related adjustments and/or optimizations based on such network resource usage patterns, and provide appropriate commands (e.g., policy information) to the master system to continually improve the overall performance of the network. Analyzing such trends and/or behavior may, for example, permit the management platform to identify changing characteristics of an in-premises network, such as increases, or decreases, in a quantity of end-user devices (and/or associated users) on the in-premises network, changes in Wi-Fi behavior (e.g., due to remodeling in the premises), changes in Wi-Fi behavior in neighboring premises, and/or the like. Such information enables the management platform to determine network optimizations that better meet expected behaviors of end-user devices not only when initially deployed but also over time (e.g., months, years, etc.).

In some implementations, the management platform may use one or more machine learning algorithms configured to learn network resource usage trends of a particular device (e.g., a master device, an agent device, or an end-user device). In some implementations, the management platform may provide information regarding network resource usage trends of a particular device as input to one or more machine learning algorithms, which may perform machine learning to automate future determinations or predictions of upcoming network resource usage by the particular device. For example, the management platform may train a machine learning algorithm based on known inputs (e.g., information regarding types of traffic sent and/or received by the particular device, information regarding service applications being executed in the particular device, and/or the like, over a time period) and known outputs (e.g., actual network resource usage by the particular device during certain times of day, days of week, days of month, days of year, and/or the like). In some implementations, the management platform may refine a machine learning algorithm based on feedback received from a user of the particular device and/or from one or more other devices (e.g., other management device(s)). For example, the user of the particular device and/or one or more other management devices may provide information indicating whether predictions of upcoming network resource usage, made by the machine learning algorithm, are accurate and/or helpful. When the information indicates that a particular prediction is accurate and/or helpful, the management platform may configure the machine learning algorithm to make predictions of upcoming network resource usage based on the particular prediction (e.g., to predict upcoming network resource usage in a manner similar to that in which the particular prediction was made). When the information indicates that a particular prediction is not accurate or helpful, the management platform may configure the machine learning algorithm to avoid predicting upcoming network resource usage in a manner in which the particular prediction was made. In this way, the management platform can predict upcoming network resource usage based on a machine learning algorithm, which improves the accuracy of the predictions, and conserves processor resources and storage resources that may otherwise be used to generate and store rules for predicting upcoming network resource usage. This enables the management platform to optimize the performance of an in-premises network as well as offer improved services and/or applications to subscribers that meet the subscribers' needs.

In some implementations, the network and resource management system may be configured to manage SLA profiles for each device (e.g., the master device, each agent device, and each end-user device) on an in-premises network. In some implementations, a predefined SLA profile (e.g., with certain KPI thresholds) may be associated with a recognized device (e.g., recognized by device type information and/or the like), such as devices provided by certain manufacturers. In a case where a device is not recognized, a default SLA profile (e.g., with default KPI thresholds) may be associated with the device. In some implementations, the management platform, the master system, and/or one or more agent systems may be configured to automatically associate an SLA profile with each end-user device that communicatively couples to the in-premises network.

In some implementations, an SLA profile, associated with a master device and/or an agent device, may include KPI thresholds relevant for the service(s) to which an associated subscriber is subscribed, such as an Internet service, a voice service, a voice-assist service, a security service, a video service, and/or the like. In some implementations, such KPI thresholds may include thresholds relating to WLAN performance, such as an airtime availability threshold, a channel band capacity threshold, and/or the like, which may be utilized to ensure that no one access point becomes overloaded. In some implementations, such KPI thresholds may include thresholds relating to a backhaul of an in-premises network (e.g., thresholds relating to limits of one or more media of a backbone of the in-premises network), which may be utilized to ensure that no medium of the backbone becomes overloaded.

In some implementations, the management platform may be configured to generate, and manage, SLA profile libraries based on data obtained from master systems associated with different in-premises networks. In some implementations, the management platform may be configured to modify thresholds, included in an SLA profile (e.g., associated with a master device, an agent device, or an end-user device), based on identified network usage patterns, and provide modified SLA profiles to the master system (e.g., for updating in the master system and/or associated agent systems).

In some implementations, the management platform may be configured to identify different uses, by subscribers associated with different in-premises networks, of a particular device type, and set, modify, and/or store different SLA profiles accordingly. For example, the management platform may set a first SLA profile for a tablet device that is used (e.g., by a first subscriber associated with a first in-premises network) mainly for video streaming, and set a second SLA profile, different than the first SLA profile, for an identical tablet device that is used (e.g., by a second subscriber associated with a second in-premises network) mainly for web browsing. This enables tailoring of SLA profiles for devices based on actual usage of network resources by those devices.

In some implementations, the management platform may be configured to perform a variety of additional functions, including functions relating to data storage and/or data analysis (e.g., storage of event data, such as logs, SLA profile updates, information regarding steering actions, and/or the like), classification of end-user devices (including, for example, modification of SLA profiles over time as needed), addition of SLA profiles (e.g., as new end-user devices, agent devices, and/or master devices are detected over time), performance monitoring (e.g., monitoring of overall network performance, network resource usage trends (e.g., new usage trends and/or behavior, including suspicious behaviors and/or the like)), service monitoring (e.g., detection of increasing, or decreasing, usage of certain services, which may suggest a need for additional, or reduced, network resources, and enable a network service provider to offer upgrade opportunities as relevant), and/or the like.

In this way, the network and resource management system may manage QoE by determining how to allocate network bandwidth (e.g., a minimum bandwidth) to individual end-user devices based on SLA profiles associated with the end-user devices, needs of service applications being executed by the end-user devices, capabilities of access points and/or other in-premises network components, and/or the like.

In some implementations, the management platform may be configured to detect (e.g., based on the above-described data, such as parametric data and/or the like) suspicious device behavior in an in-premises network, determine whether a device (e.g., an end-user device) and/or the in-premises network is under attack (e.g., is infected with a virus, malware, and/or the like), and perform an action based on a result of the determination. For example, in a case where the management platform determines that a device and/or the in-premises network is under attack, the management platform may provide a notification (e.g., to an associated subscriber (e.g., to the master system for presentation to the associated subscriber) and/or to a technical support team associated with the network service provider) indicating that preventative measures may need to be taken.

In some implementations, the management platform may be configured to identify network-related issues that may be beyond the control of the network and resource management system. For example, the management platform may identify, based on the above-described data (e.g., parametric data and/or the like) that a servicer tier to which a subscriber is subscribed may be insufficient to meet the subscriber's high network resource usage, that an area in the subscriber's premises is lacking in Wi-Fi coverage, and/or the like. In such cases, the management platform may be configured to provide a notification to the associated subscriber (e.g., via phone, e-mail, text message, and/or the like) and/or to a technical support team to alert, or recommend to, the subscriber and/or the technical support team to one or more suitable actions to take (e.g., to upgrade the service tier, to install an additional extender access point, to move an existing extender access point, and/or the like).

In some implementations, the network and resource management system (e.g., the management platform, the master system, and/or agent system(s)) may utilize one or more algorithms to determine network resource needs of an end-user device and an optimal access point for the end-user device to connect to. For example, in some implementations, the management platform and/or the master system may obtain, from each agent system, information regarding end-user devices currently connected to a corresponding agent device, any end-user devices that were previously connected to the corresponding agent device, and/or the like, determine a score for each end-user device with respect to each agent device, based on the information, and utilize the scores to determine steering operations, load balancing operations, and/or the like.

In some implementations, a score may be determined based on a variety of factors, including an SLA profile associated with the agent device, an SLA profile associated with the end-user device, a quality, or strength, of a connection between the end-user device and the agent device (e.g., an RSSI) on a current channel band (which may, for example, indicate how far the end-user device is from the agent device), whether the end-user device is blacklisted, a type of traffic that the end-user device is currently sending and/or receiving, a device type of the end-user device, security capabilities of the agent device, airtime availability on the agent device, channel band occupancy of the agent device, load on the agent device, and/or the like.

Figure 1C:
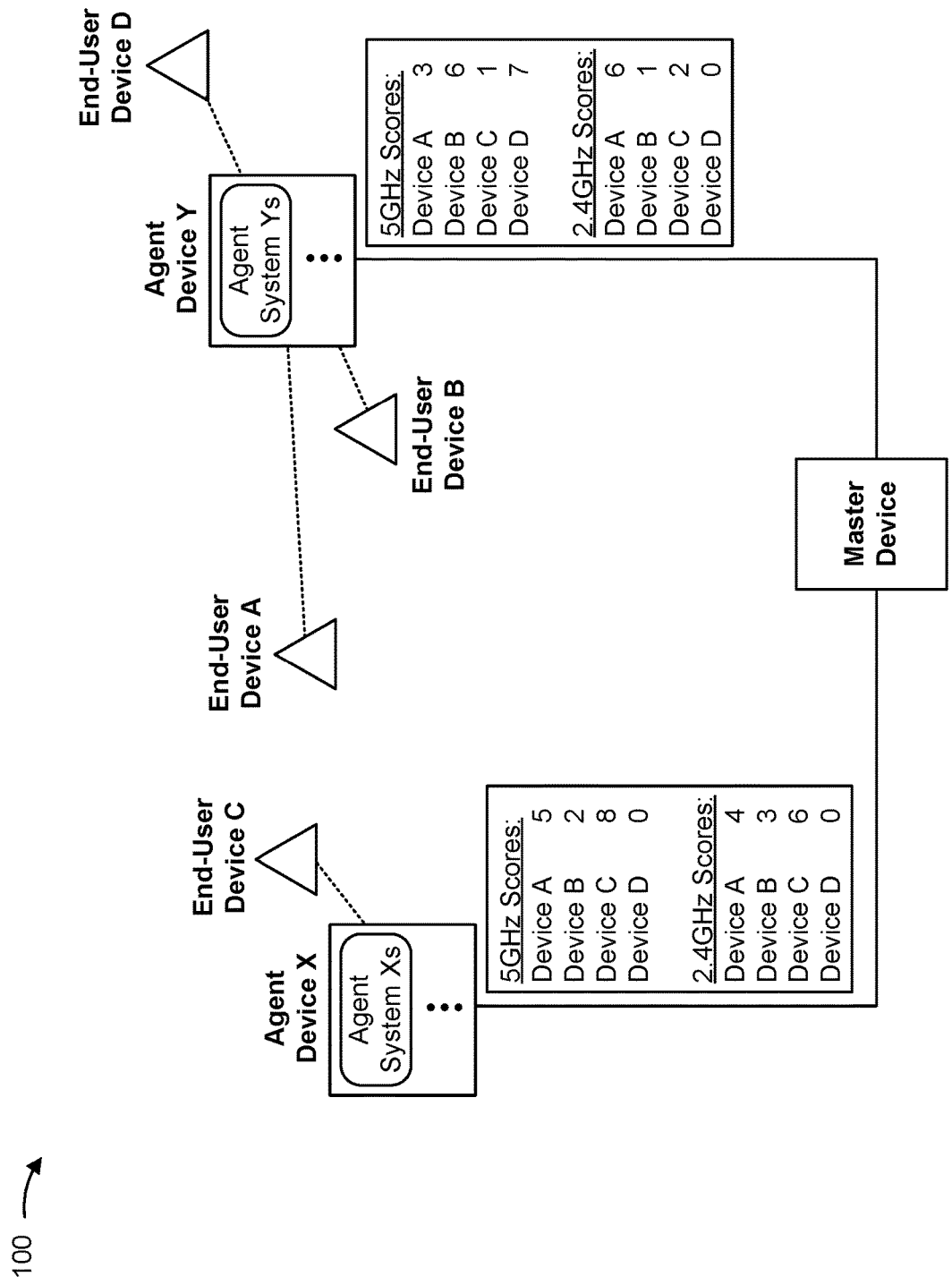

FIG. 1C is a diagram that shows an example score-based management scheme that may be implemented by the network resource and management system. As shown in FIG. 1C, an end-user device C is communicatively coupled to an agent device X, and end-user devices A, B, and D are communicatively coupled to an agent device Y. As shown, an agent system Xs, hosted by agent device X, may calculate, and maintain, scores (e.g., ranging from a lowest score of '0' to a highest score of '10') for the various end-user devices—here, for example, the score is '8' for end-user device C on a first channel band of agent device X, and the score is '6' for end-user device C on a second channel band of agent device X. As further shown, an agent system Ys, hosted by agent device Y, may similarly calculate, and maintain, scores for the various end-user devices—here, for example, the scores are '3', '6', and '7' for end-user devices A, B, and D, respectively, on a first channel band of agent device Y, and the scores are '6', '1', and '0' for end-user devices A, B, and D, respectively, on a second channel band of agent device Y.

In various implementations, the master system may be configured to steer an end-user device to another channel band of an agent device, or to a particular channel band of another agent device, where a score for the end-user device is higher or the highest. As an example, in a case where end-user device A is initially communicatively coupled to agent device Y over the first channel band of agent device Y, and where a current score for end-user device A on the second channel band of agent device Y (e.g., '6') is determined to be higher than the score for end-user device A on the first channel band of agent device Y (e.g., '3'), the master system may steer end-user device A to the second channel band of agent device Y.

In some cases, and as described briefly above, certain end-user devices and/or certain service applications may have higher priority over other end-user devices and/or other service application. In such cases, the management platform and/or the master system may be configured to manage steering of end-user devices based on such priorities. For example, in a case where the master system determines that end-user device A is to be steered to the second channel band of agent device Y (e.g., due to the higher score, as described above), and yet a priority of end-user device B (e.g., currently communicatively coupled to the second channel band of agent device Y) is higher than a priority of end-user device A (and/or that a priority of a service application executing in end-user device B is higher than a priority of a service application executing in end-user device A), the master system may refrain from steering end-user device A to the second channel band of agent device Y so as to permit end-user device B to continue to utilize network resources provided over the second channel band of agent device Y. This permits enforcement of priority traffic flows for end-user devices and/or services applications.

Figure 1D:
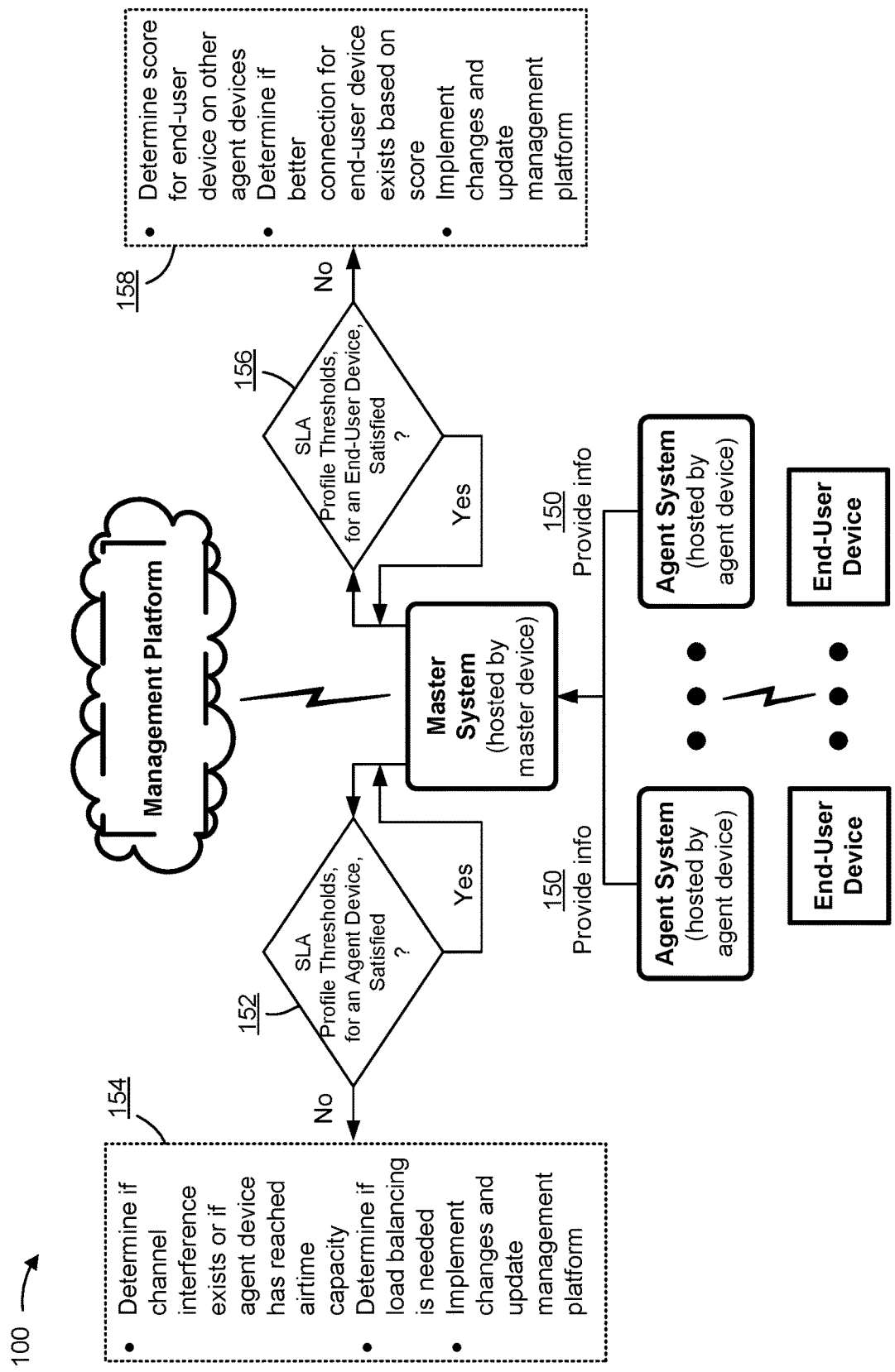

FIG. 1D is a diagram of an example high-level process that may be implemented by the network and resource management system. As shown, the network and resource management system may include a management platform implemented as a cloud-based platform, and various devices on an in-premises network, including a master system hosted by a master device, and multiple agent systems hosted by respective agent devices. As shown by reference number 150, each agent system may provide information, regarding the corresponding agent device and/or end-user devices communicatively coupled to the corresponding agent device, to the master system. For example, the information may include parametric data, reports, and/or alerts, as described above.

As shown by reference number 152, the master system may determine, based on the information, whether one or more thresholds, included in an SLA profile associated with an agent device, are satisfied. If the master system determines that the one or more thresholds are satisfied (reference number 152—YES), the process may return to reference number 152. If the master system determines that the one or more thresholds are not satisfied (reference number 152—NO), as shown by reference number 154, the process may include performing various operations, including determining whether there exists channel interference, determining whether a particular agent device has reached an associated airtime capacity, and/or determining whether load balancing is needed, implementing any adjustments based on one or more of such determinations, and providing corresponding updates to the management platform (e.g., for storage and/or subsequent analysis and/or processing, such as that relating to long-term trends and behavior, as described above).

As shown by reference number 156, the master system may determine whether one or more thresholds, included in an SLA profile associated with an end-user device (e.g., communicatively coupled to one of the agent devices), are satisfied. If the master system determines that the one or more thresholds are satisfied (reference number 156—YES), the process may return to reference number 156. If the master system determines that the one or more thresholds are not satisfied (reference number 156—NO), as shown by reference number 158, the process may include performing various operations, including calculating score(s) for the end-user device with respect to other agent devices on the network, determining whether to steer the end-user device to another agent device based on the score(s), implementing any adjustments based on the determination, and providing corresponding updates to the management platform (e.g., for storage and/or subsequent analysis and/or processing, such as that relating to long-term trends and behavior, as described above).

Figure 1E:
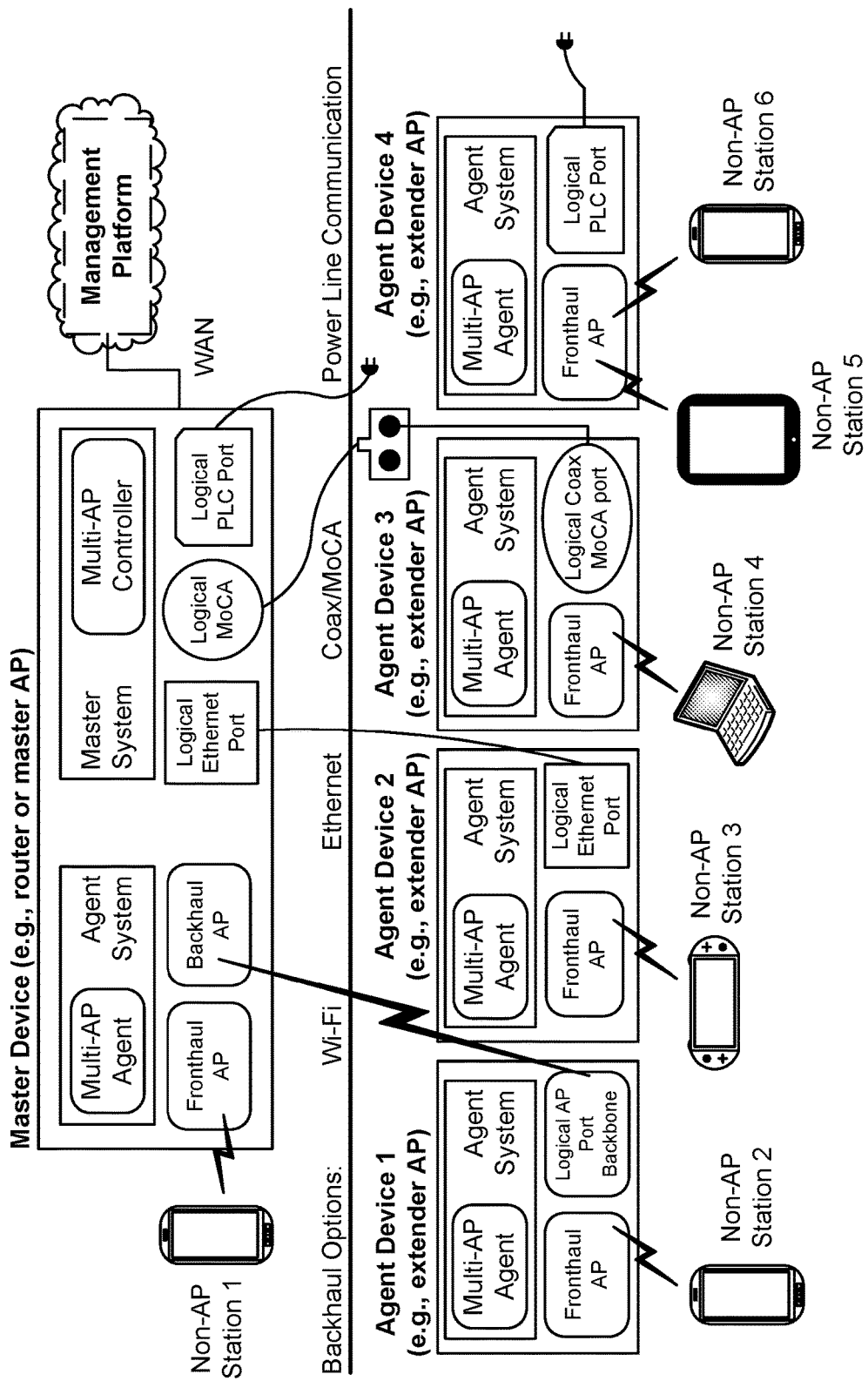

In some implementations, the network and resource management system may utilize two types of logical entities from the Wi-Fi Alliance Multi-AP technical specification—the multi-AP controller and the multi-AP agent—as part of implementing the master system and the agent system. FIG. 1E is a diagram of an example multi-AP deployment of the network and resource management system. As shown in FIG. 1E, for example, a master system, hosted by a master device, may contain a multi-AP controller, and each agent system, hosted by a respective agent device, may contain a multi-AP agent. Here, the multi-AP controller may be configured to provide commands to each multi-AP agent, and each multi-AP agent may be configured to execute operations based on the corresponding commands. In some implementations, a multi-agent may communicatively couple with Wi-Fi-enabled devices, obtain data (e.g., device information, parametric data, and/or the like, as described above) from the Wi-Fi-enabled devices, and provide the data to the multi-AP controller for purposes of optimizing performance of the in-premises network (e.g., as described above).

In some implementations, the multi-AP controller may be configured to perform a variety of functions, such as, for example, functions relating to registration, configuration, reporting (e.g., of measurement and capability data), commands, operations, onboarding, provisioning, and/or the like. In some implementations, the functions relating to registration, configuration, and reporting may be in accordance with the Wi-Fi Alliance specification. For example, the functions relating to registration and configuration may include controller discovery, operational reporting, policy configuration, association/disassociation, service discovery, and/or the like. As another example, the reporting function may relate to fronthaul access point measurements and capabilities, Wi-Fi-enabled device measurements and capabilities, backbone measurements and capabilities, channel capabilities (e.g., preferences and restrictions), and/or the like.

In some implementations, a multi-AP agent may be configured to perform a variety of functions, including, for example, functions relating to registration, configuration, reporting (e.g., of measurement and capabilities data), execution of commands and/or functions provided by the multi-AP controller, operation of a Wi-Fi subsystem interface, and/or the like.

Providing end-to-end access point, and device, management throughout a subscriber's in-premises network (e.g., including via device steering and/or load balancing), based on device type, service applications being executed, and/or the like, optimizes device-to-device connections, which improves overall network performance and reliability. Learning of network resource usage patterns, based on parametric data collected over time, also enables continual adjustments to be made to further optimize network performance (e.g., as device behavior changes over time). Parametric data analyses also allow a network service provider to identify network-related issues, and take appropriate action(s) quickly—including, for example, notifying an affected subscriber and/or technical support teams—to address the issues, which enables more efficient issue resolution and improves overall service reliability.

As indicated above, FIGS. 1A-1E are provided merely as examples. Other examples are possible and may differ from what was described with regard to FIGS. 1A-1E.

For example, in practice, there may be additional devices, elements, components, and/or networks, fewer devices, elements, components, and/or networks, different devices, elements, components, and/or networks, or differently arranged devices, elements, components, and/or networks than those variously shown in FIGS. 1A-1E. Furthermore, two or more devices, elements, components, and/or networks shown in one or more of FIGS. 1A-1E may be implemented within a single device, element, component, and/or network, or a single device, element, component, and/or network shown in one or more of FIGS. 1A-1E may be implemented as multiple, distributed devices, elements, components, and/or networks.

As another example, in some implementations, the network and resource management system may, in addition to managing an in-premises network, also provide transitional management between wireless (e.g., cellular) and WLAN domains (e.g., such as when an end-user device (e.g., a smartphone and/or the like) moves within a WLAN coverage range of a subscriber's premises and out of the WLAN coverage range) to ensure optimal throughput and user experience.

As yet another example, in some implementations, a master device may support WLAN (e.g., Wi-Fi) activity. In such cases, the master device may additionally host an agent system configured to provide the various functions of an agent system described above.

As an additional example, in some implementations, management and control by the network resource and management system may be carried out over secure protocols. For example, management or control connections between a master system and the management platform and/or between the master system and the agent system(s) may be implemented via mutual authentication protocols (e.g., based on the Transport Layer Security (TLS) protocol, the Secure Shell (SSH) protocol, and/or the like).

As a further example, in some implementations, the management platform may include additional functions, such as those relating to provisioning and orchestration, an operations support system (OSS), and/or a business support system (BSS). For example, the management platform may include a provisioning and orchestration system, an automated OSS, and an automated BSS.

In various implementations, the provisioning and orchestration system may provide support for base firmware (e.g., specific to each service segment, such as fiber optic-based Internet service, 5G fixed wireless service, low-cost Internet service, network services for small companies and/or medium-sized companies, and/or the like), middleware support (e.g., for hardware modules, for protocols (e.g., SON and/or the like), for telemetry, relating to the Digital Living Network Alliance (DLNA), and/or the like), and/or application support (e.g., relating to services, such as security services, firewall services, parental controls services, content delivery services, and/or the like).

In some implementations, the provisioning and orchestration system may be configured to provide service provisioning. Service provisioning may include provisioning various physical resources, virtual resources, and application resources when a new service is to be added for a subscriber. In some implementations, the provisioning and orchestration system may be configured to provision general data services (e.g., routing services) as needed, such as those relating to voice services, voice-assist services, deep packet inspection (DPI), security services, a secure domain name service (DNS), a content delivery network (CDN) service, and/or the like.

In some implementations, the provisioning and orchestration system may be configured to provide resource management. Resource management may include management of resources allocated for services available to a subscriber or associated customer premises equipment device. In some implementations, the provisioning and orchestration system may be configured to conduct service monitoring and/or performance monitoring. Service monitoring and/or performance monitoring may include monitoring a service, and resources allocated for the service, to ensure that service guidelines and/or performance guidelines are met.

In some implementations, the provisioning and orchestration system may be configured to provide application and service management. Application and service management may include monitoring application and service performance as well as detection and diagnosis of performance issues and implementing remedies (e.g., rebooting and/or dynamically assigning or re-routing resources) to ensure that performance guidelines are met.

In some implementations, the OSS may provide automated management of operational parametric data (e.g., needed to operationally define each service), automated management of performance metrics, KPI thresholds, and/or the like (e.g., needed to monitor performance of each service), management of alerts and/or event notifications (e.g., including actions based on operational parametric thresholds, or performance thresholds, being satisfied, such as relocating a service to a redundant link, providing, by a network operations center, a notification to a subscriber regarding a service issue, and/or the like), and/or overall automated systems management (e.g., including monitoring and/or managing network resources, server devices, storage, license, resource usage, versioning, updates, patches, backups, security (e.g., anti-virus tools/updates and/or the like), and/or the like).

In some implementations, the BSS may provide various functionality, such as order processing (e.g., traditional order processing, staging of services in the provisioning and orchestration system, and/or the like), service validation (e.g., confirmation that delivery of service has met functional expectations, such as event orchestration being successful and/or all elements of event orchestration across all functional levels meeting expectations), fraud prevention (e.g., theft prevention mechanisms and security mechanisms for protecting subscriber information), performing service renewals and/or providing corresponding notifications (e.g., notifications to subscribers or billing systems for continued service), product catalog management (e.g., high-level product cataloguing of deployable services and variants of such services), billing (e.g., to account for overall subscriber resource usage), and/or the like.

Figure 2:
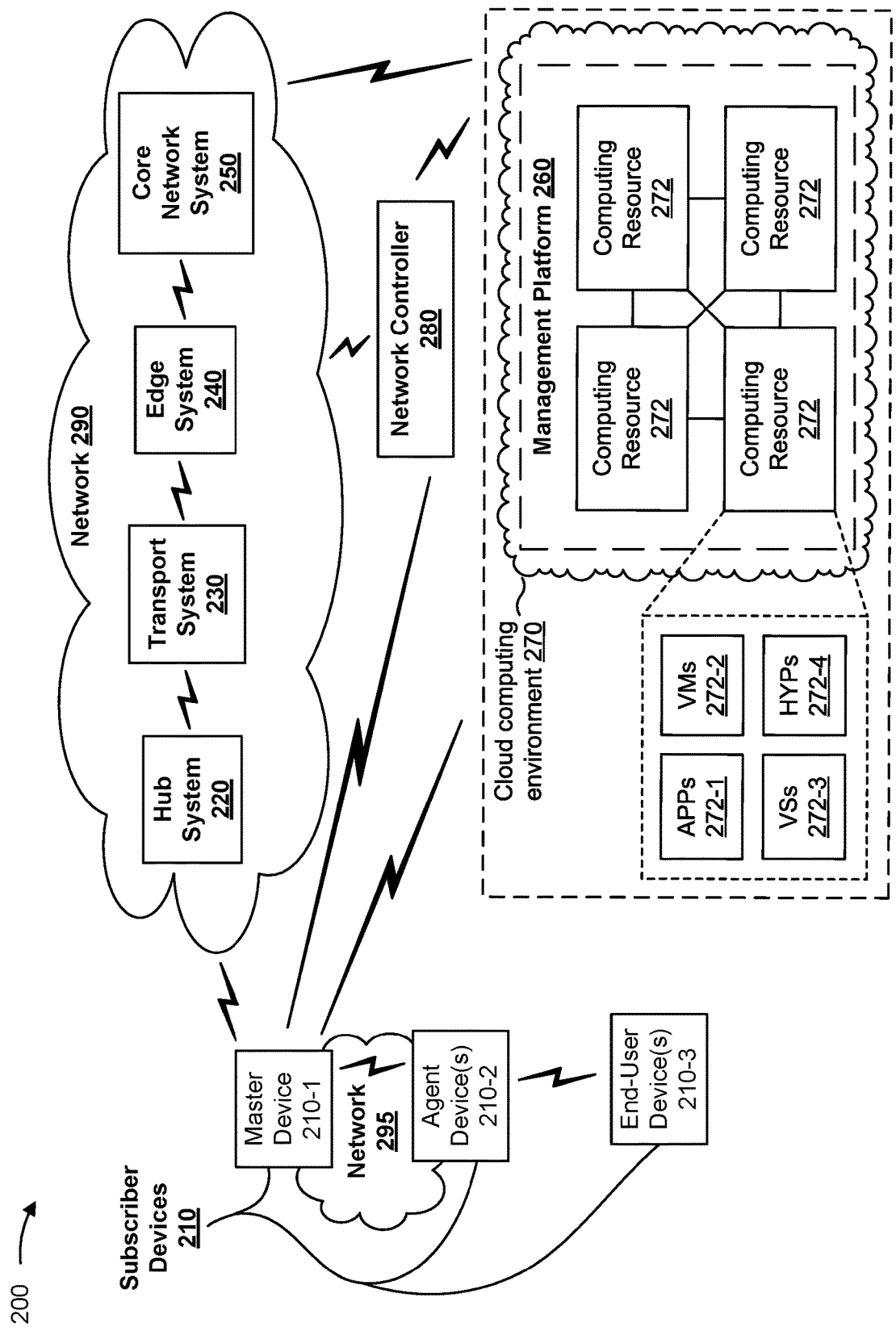
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include subscriber devices 210, a hub system 220, a transport system 230, an edge system 240, a core network system 250, a management platform 260, a network controller 280, a network 290, and a network 295. Devices of environment 200 may interconnect via wired connections, wireless connections, or a combination of wired and wireless connections.

Subscriber devices 210 include one or more devices capable of receiving, generating, storing, processing, and/or providing data associated with hub system 220, transport system 230, edge system 240, core network system 250, management platform 260, and/or network controller 280. As shown in FIG. 2, subscriber devices 210 may include a master device 210-1, agent device(s) 210-2, and end-user device(s) 210-3.

Master device 210-1 includes one or more devices capable of receiving, generating, storing, processing, and/or providing data. For example, master device 210-1 may include one or more computing devices, server devices, routers, switches, firewalls, and/or the like. In some implementations, master device 210-1 may be a primary access point (e.g., including a wireless router, a wireless access point, a gateway, a mobile hotspot, and/or the like) that provides access to network 290. In some implementations, master device 210-1 may host a master system configured to provide local management of an in-premises network (e.g., network 295), as described elsewhere herein. In some implementations, master device 210-1 may host a containerized system that includes containers in which applications (e.g., service applications, such as the master system) may be instantiated. In some implementations, master device 210-1 may be communicatively coupled to hub system 220 via wired connections (e.g., based on fiber (e.g., such as in a passive optical network ("PON"), a gigabit PON ("GPON"), a next generation PON ("NGPON"), a second generation NGPON or 40 Gigabit-capable PON ("NGPON2"), and/or the like), based on copper (e.g., such as in an Ethernet network), and/or the like) or wireless connections (e.g., based on a 4G network, a 5G network, and/or another next generation network).

Agent device(s) 210-2 includes one or more devices capable of receiving, generating, storing, processing, and/or providing data. For example, an agent device 210-2 may include one or more computing devices, server devices, routers, switches, firewalls, and/or the like. In some implementations, an agent device 210-2 may be a secondary access point (e.g., including a wireless router, a wireless access point, a Wi-Fi extender, a Wi-Fi repeater, a Wi-Fi booster, a gateway, and/or the like) that provides access to network 290 via master device 210-1. In some implementations, an agent device 210-2 may provide access to network 290 via network 295 to which end-user devices 210-3 may connect using the same credentials as when connecting to master device 210-1. In some implementations, an agent device 210-2 may host an agent system configured to interact with a master system, hosted by master device 210-1, to facilitate management of an in-premises network (e.g., network 295), as described elsewhere herein. In some implementations, agent device 210-2 may host a containerized system that includes containers in which applications (e.g., service applications, such as the agent system) may be instantiated.

End-user device(s) 210-3 includes one or more devices capable of receiving, generating, storing, processing, and/or providing data. For example, an end-user device 210-3 may include a communication and/or computing device, such as a mobile phone (e.g., a smart phone, a radiotelephone, etc.), a desktop computer, a laptop computer, a tablet computer, a handheld computer, a gaming device, a content presentation device (e.g., an audio player, a video player, and/or the like), a device integrated within a vehicle, a wearable communication device (e.g., a smart wristwatch, a pair of smart eyeglasses, etc.), an IoT device, or a similar type of device. In some implementations, end-user device 210-3 may communicatively couple to one or more agent devices 210-2 to gain access to network 290, and provide data (e.g., device information, parametric data, and/or the like) to agent system(s), hosted by agent device(s) 210-2, as described elsewhere herein.

Hub system 220 includes one or more devices capable of receiving, generating, storing, processing, and/or providing data associated with subscriber devices 210, transport system 230, edge system 240, core network system 250, management platform 260, and/or network controller 280. For example, hub system 220 may include one or more computing devices, server devices, routers, switches, firewalls, and/or the like for exchanging data between subscriber devices 210 and transport system 230. In some implementations, hub system 220 may include an access aggregation hub configured to aggregate traffic (e.g., received from, or destined to, subscriber devices 210) transmitted over different network types.

Transport system 230 includes one or more devices capable of receiving, generating, storing, processing, and/or providing data associated with subscriber devices 210, hub system 220, edge system 240, core network system 250, management platform 260, and/or network controller 280. For example, transport system 230 may include one or more computing devices, server devices, routers, switches, firewalls, and/or the like for exchanging data between hub system 220 and edge system 240. In some implementations, in a case where hub system 220 is implemented as an access aggregation hub, transport system 230 may be implemented as a unified transport system for traffic received from, or destined to, the access aggregation hub.

Edge system 240 includes one or more devices capable of receiving, generating, storing, processing, and/or providing data associated with subscriber devices 210, hub system 220, transport system 230, core network system 250, management platform 260, and/or network controller 280. For example, edge system 240 may include one or more computing devices, server devices, routers, switches, firewalls, and/or the like for exchanging data between transport system 230 and core network system 250. In some implementations, in a case where hub system 220 is implemented as an access aggregation hub, and transport system 230 is implemented as a unified transport system, edge system 240 may be implemented as a multi-service edge system (e.g., a regional hub) for routing and/or processing traffic received from, or destined to, the unified transport system. In some implementations, edge system 240 may be capable of supporting an ultra-long-haul (ULH) core network (e.g., a ULH Dense Wavelength Division Multiplexing (DWDM) transport optical network configured to carry Internet Protocol (IP), Multiprotocol Label Switching (MPLS), and Synchronous Optical Network/Synchronous Optical Hierarchy (SONET/SDH) services).

Core network system 250 includes one or more devices capable of receiving, generating, storing, processing, and/or providing data associated with subscriber devices 210, hub system 220, transport system 230, edge system 240, management platform 260, and/or network controller 280. For example, core network system 250 may include an MPLS core network, a ULH core network, and/or the like, and may include one or more computing devices, server devices, routers, switches, firewalls, and/or the like for exchanging data between edge system 240 and an external network (not shown). In some implementations, in a case where hub system 220 is implemented as an access aggregation hub, transport system 230 is implemented as a unified transport system, and edge system 240 is implemented as a multi-service edge system, core network system 250 may be implemented as a converged core system for routing and/or processing traffic received from, or destined to, the multi-service edge system.

Management platform 260 includes one or more devices capable of receiving, generating, storing, processing, and/or providing data associated with subscriber devices 210, hub system 220, transport system 230, edge system 240, core network system 250, and/or network controller 280. In some implementations, management platform 260 may include a provisioning and orchestration system and various support systems, such as an OSS and a BSS.

Management platform 260 may include a server device or a group of server devices. In some implementations, as shown, management platform 260 can be hosted in a cloud computing environment 270. For example, management platform 260 may be implemented as a cloud-based platform in edge system 240. Notably, while implementations described herein describe management platform 260 as being hosted in cloud computing environment 270, in some implementations, management platform 260 is not cloud-based or can be partially cloud-based.

Cloud computing environment 270 includes an environment that delivers computing as a service, whereby shared resources, services, etc. can be provided to subscriber devices 210 and/or one or more other management platforms 260. Cloud computing environment 270 can provide computation, software, data access, storage, and/or other services that do not require end-user knowledge of a physical location or low latency requirements and configuration of a system and/or a device that delivers the services. As shown, cloud computing environment 270 can include a set of computing resources 272.

Computing resource 272 includes one or more personal computers, workstation computers, server devices, or another type of computation and/or communication device. In some implementations, computing resource 272 can host management platform 260. In some implementations, cloud resources can include compute instances executing in computing resource 272, storage devices provided in computing resource 272, data transfer devices provided by computing resource 272, etc. In some implementations, computing resource 272 can communicate with other computing resources 272 via wired connections, wireless connections, or a combination of wired and wireless connections.

As further shown in FIG. 2, computing resource 272 can include a group of cloud resources, such as one or more applications ("APPs") 272-1, one or more virtual machines ("VMs") 272-2, virtualized storage ("VSs") 272-3, one or more hypervisors ("HYPs") 272-4, and/or the like.

Application 272-1 includes one or more software applications that can be provided to or accessed by subscriber devices 210. Application 272-1 can eliminate a need to install and execute the software applications on subscriber devices 210. For example, application 272-1 can include software associated with management platform 260 and/or any other software capable of being provided via cloud computing environment 270. In some implementations, one application 272 1 can send/receive information to/from one or more other applications 272-1, via virtual machine 272-2.

Virtual machine 272-2 includes a software implementation of a machine (e.g., a computer) that executes programs like a physical machine. Virtual machine 272-2 can be either a system virtual machine or a process virtual machine, depending upon use and degree of correspondence to any real machine by virtual machine 272-2. A system virtual machine can provide a complete system platform that supports execution of a complete operating system (OS). A process virtual machine can execute a single program, and can support a single process. In some implementations, virtual machine 272-2 can execute on behalf of a user (e.g., subscriber devices 210) and/or on behalf of one or more other management platforms 260, and can manage infrastructure of cloud computing environment 270, such as data management, synchronization, or long-duration data transfers.

Virtualized storage 272-3 includes one or more storage systems and/or one or more devices that use virtualization techniques within the storage systems or devices of computing resource 272. In some implementations, within the context of a storage system, types of virtualizations can include block virtualization and file virtualization. Block virtualization can refer to abstraction (or separation) of logical storage from physical storage so that the storage system can be accessed without regard to physical storage or heterogeneous structure. The separation can permit administrators of the storage system flexibility in how the administrators manage storage for end users. File virtualization can eliminate dependencies between data accessed at a file level and a location where files are physically stored. This can enable optimization of storage use, server consolidation, and/or performance of non-disruptive file migrations.

Hypervisor 272-4 provides hardware virtualization techniques that allow multiple operating systems (e.g., "guest operating systems") to execute concurrently on a host computer, such as computing resource 272. Hypervisor 272-4 can present a virtual operating platform to the guest operating systems, and can manage the execution of the guest operating systems. Multiple instances of a variety of operating systems can share virtualized hardware resources.

Network controller 280 includes one or more devices capable of receiving, generating, storing, processing, and/or providing data associated with subscriber devices 210, hub system 220, transport system 230, edge system 240, core network system 250, and/or management platform 260. For example, network controller 280 may include one or more computing devices, server devices, routers, switches, firewalls, and/or the like. In some implementations, network controller 280 may communicate with management platform 260 and subscriber devices 210 to facilitate provisioning of services and/or deployment of corresponding service applications to subscriber devices 210. In some implementations, network controller 280 may include telemetry functions associated with the services.

Network 290 includes one or more wired and/or wireless networks. For example, network 290 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

Network 295 includes one or more LANs that provide access to network 290 for end-user devices 210-3. For example, network 295 may include a wired network and/or a wireless network provided by master device 210-1 and/or agent device(s) 210-2. In some implementations, network 295 may include a WLAN, such as a Wi-Fi network, a Bluetooth network, and/or the like.

The number and arrangement of devices, systems, and networks shown in FIG. 2 are provided as an example. In practice, there may be additional devices, systems, and/or networks, fewer devices, systems, and/or networks, different devices, systems, and/or networks, or differently arranged devices, systems, and/or networks than those shown in FIG. 2. Furthermore, two or more devices and/or systems shown in FIG. 2 may be implemented within a single device and/or system, or a single device and/or system shown in FIG. 2 may be implemented as multiple, distributed devices and/or systems. Additionally, or alternatively, a set of devices and/or systems (e.g., one or more devices and/or systems) of environment 200 may perform one or more functions described as being performed by another set of devices and/or systems of environment 200.

Figure 3:
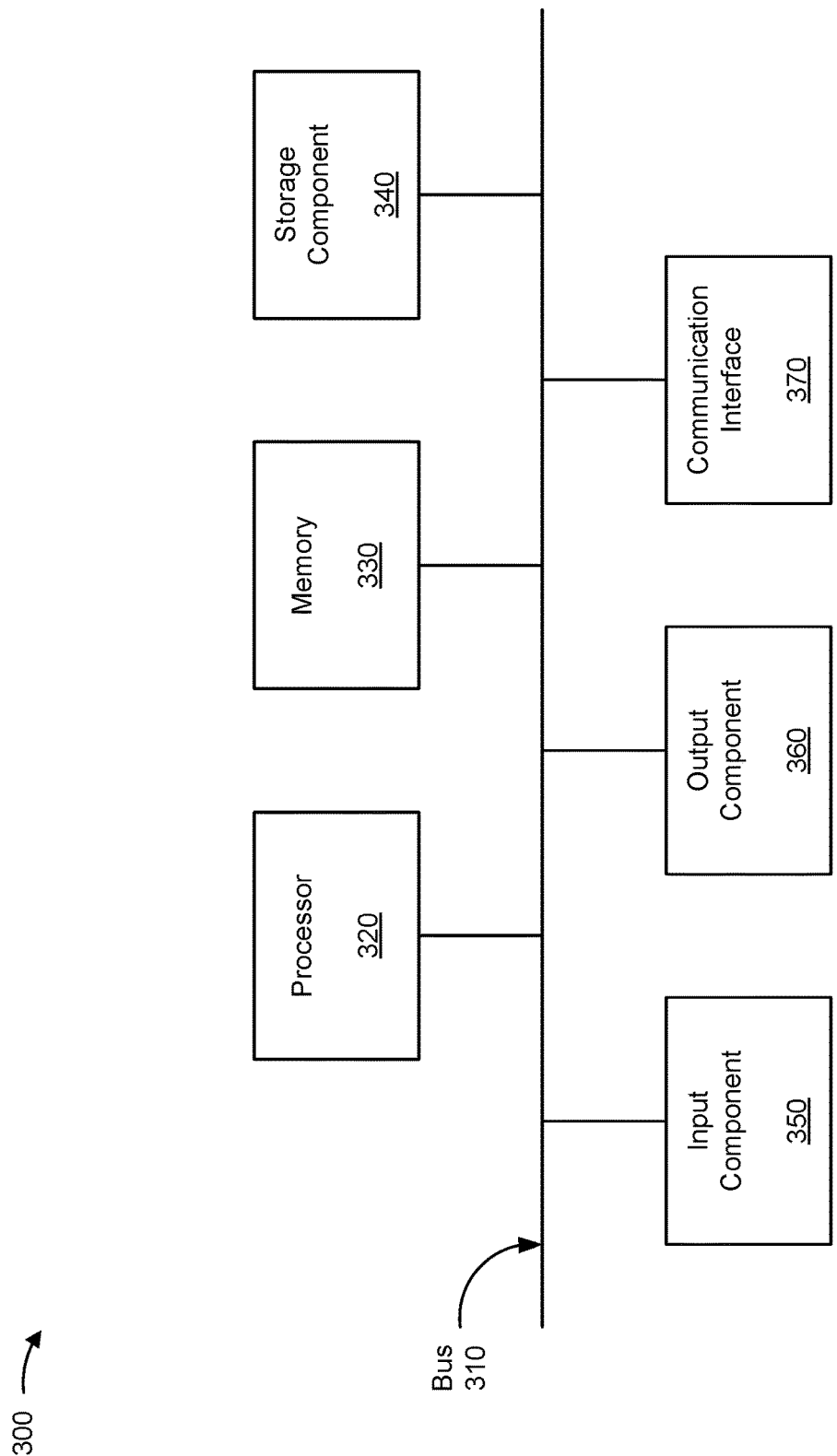
FIG. 3 is a diagram of example components of one or more devices of FIG. 2.

FIG. 3 is a diagram of example components of a device 300. Device 300 may correspond to subscriber device 210, hub system 220, transport system 230, edge system 240, core network system 250, management platform 260, and/or network controller 280. In some implementations, subscriber device 210, hub system 220, transport system 230, edge system 240, core network system 250, management platform 260, and/or network controller 280 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, an actuator, and/or image sensor(s) (e.g., camera(s))). Output component 360 includes a component that provides output information from device 300 (e.g., a display, a speaker, haptic feedback, and/or one or more LEDs).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a powerline interface, a radio frequency (RF) interface, a universal serial bus (USB) interface, a wireless local area network interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
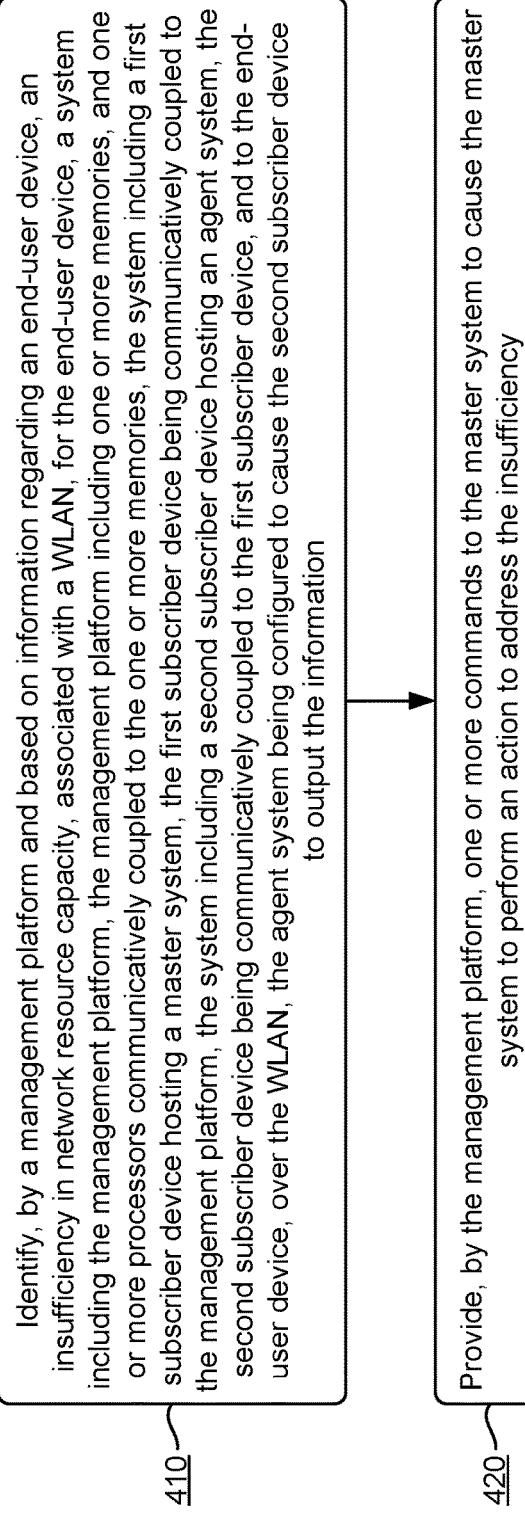
FIG. 4 is a flow chart of an example process for optimizing the performance of a network.

FIG. 4 is a flow chart of an example process 400 for optimizing the performance of a network. In some implementations, one or more process blocks of FIG. 4 may be performed by a management platform (e.g., management platform 260). In some implementations, one or more process blocks of FIG. 4 may be performed by another device or a group of devices separate from or including the management platform, such as a subscriber device 210 (e.g., a master device (e.g., master device 210-1), an agent device (e.g., an agent device 210-2), and/or an end-user device (e.g., an end-user device 210-3)), hub system 220, transport system 230, edge system 240, core network system 250, and/or network controller 280. In some implementations, a system may include the management platform (e.g., which may be implemented in a cloud computing environment, such as cloud computing environment 270). In some implementations, the management platform (e.g., the cloud computing environment) may include one or more memories and one or more processors communicatively coupled to the one or more memories. In some implementations, the system may include a first subscriber device (e.g., a master device 210-1) hosting a master system. In some implementations, the first subscriber device may be communicatively coupled to the management platform. In some implementations, the system may include a second subscriber device (e.g., agent device 210-2) hosting an agent system. In some implementations, the second subscriber device may be communicatively coupled to the first subscriber device, and to an end-user device (e.g., end-user device 210-3), over a wireless local area network (WLAN) (e.g., network 295). In some implementations, the agent system may be configured to cause the second subscriber device to output information regarding the end-user device. In some implementations, the management platform may be configured to cause the one or more processors to perform process 400.

As shown in FIG. 4, process 400 may include identifying, based on the information, an insufficiency in network resource capacity, associated with the WLAN, for the end-user device (block 410). For example, the management platform (e.g., using computing resource 272, processor 320, memory 330, storage component 340, and/or the like) may identify, based on the information, an insufficiency in network resource capacity, associated with the WLAN, for the end-user device, as described above in connection with FIGS. 1A-1E.

As further shown in FIG. 4, process 400 may include providing one or more commands to the master system to cause the master system to perform an action to address the insufficiency (block 420). For example, the management platform (e.g., using computing resource 272, processor 320, memory 330, storage component 340, output component 360, communication interface 370, and/or the like) may provide one or more commands to the master system to cause the master system to perform an action to address the insufficiency, as described above in connection with FIGS. 1A-1E.

Process 400 may include additional implementations, such as any single implementation or any combination of implementations in connection with one or more other processes described elsewhere herein.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
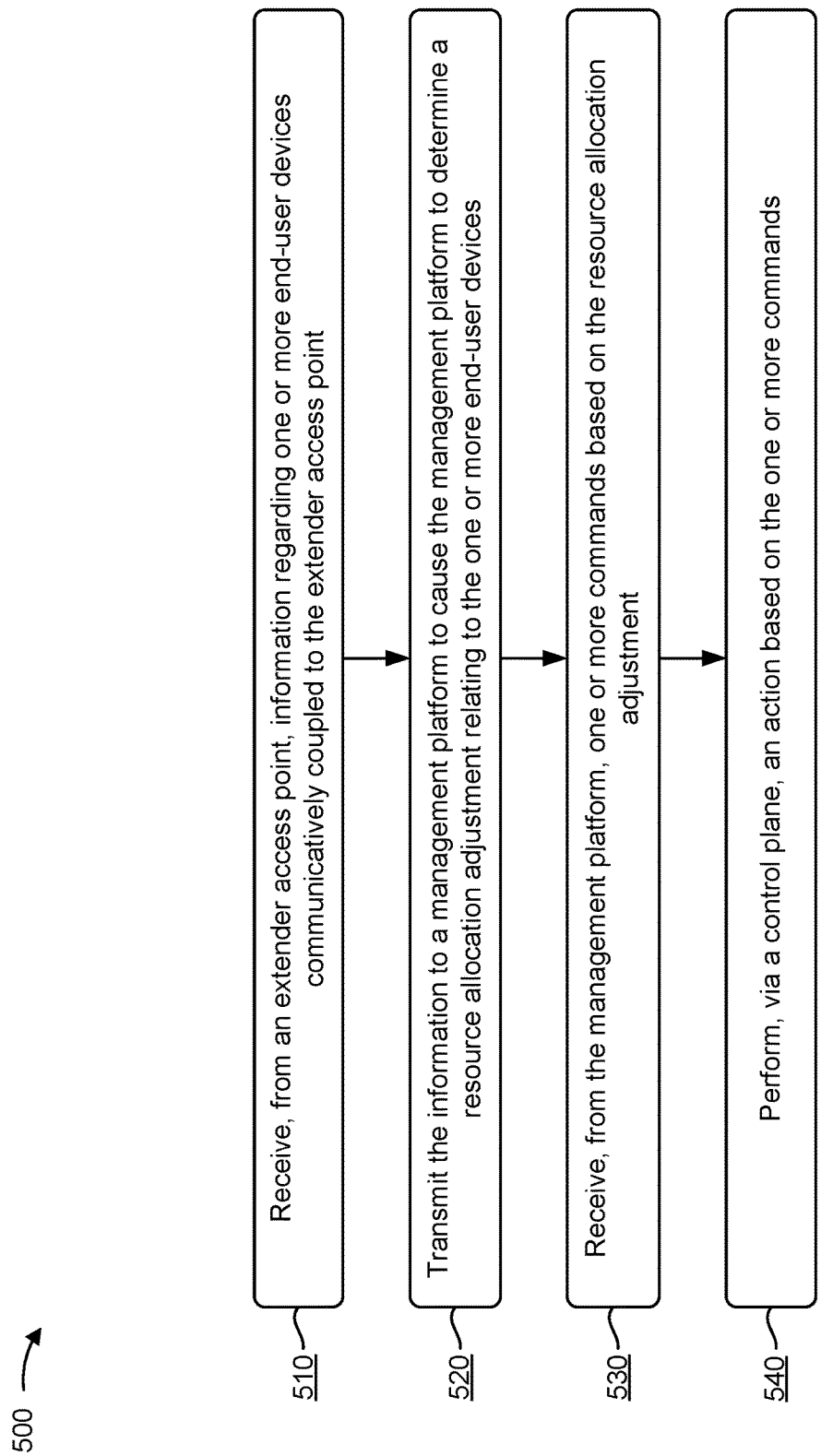
FIG. 5 is a flow chart of an example process for optimizing the performance of a network.

FIG. 5 is a flow chart of an example process 500 for optimizing the performance of a network. In some implementations, one or more process blocks of FIG. 5 may be performed by a master access point (e.g., master device 210-1). In some implementations, one or more process blocks of FIG. 5 may be performed by another device or a group of devices separate from or including the master access point, such as an extender access point (e.g., an agent device 210-2), an end-user device (e.g., an end-user device 210-3), a management platform (e.g., management platform 260), hub system 220, transport system 230, edge system 240, core network system 250, and/or network controller 280.

As shown in FIG. 5, process 500 may include receiving, from an extender access point, information regarding one or more end-user devices communicatively coupled to the extender access point, the master access point being communicatively coupled to an external network (e.g., network 290), the external network including the management platform, the master access point and the extender access point being communicatively coupled to one another over an in-premises network (e.g., network 295), and the master access point implementing a control plane for controlling the extender access point (block 510). For example, the master access point (e.g., using processor 320, memory 330, storage component 340, input component 350, communication interface 370, and/or the like) may receive, from an extender access point, information regarding one or more end-user devices communicatively coupled to the extender access point, as described above in connection with FIGS. 1A-1E. In some implementations, the master access point may be communicatively coupled to an external network. In some implementations, the external network may include a management platform. In some implementations, the master access point and the extender access point may be communicatively coupled to one another over an in-premises network. In some implementations, the master access point may implement a control plane for controlling the extender access point.

As further shown in FIG. 5, process 500 may include transmitting the information to the management platform to cause the management platform to determine a resource allocation adjustment relating to the one or more end-user devices (block 520). For example, the master access point (e.g., using processor 320, memory 330, storage component 340, output component 360, communication interface 370, and/or the like) may transmit the information to the management platform to cause the management platform to determine a resource allocation adjustment relating to the one or more end-user devices, as described above in connection with FIGS. 1A-1E.

As further shown in FIG. 5, process 500 may include receiving, from the management platform, one or more commands based on the resource allocation adjustment (block 530). For example, the master access point (e.g., using computing resource 272, processor 320, memory 330, storage component 340, input component 350, communication interface 370, and/or the like) may receive, from the management platform, one or more commands based on the resource allocation adjustment, as described above in connection with FIGS. 1A-1E.

As further shown in FIG. 5, process 500 may include performing, via the control plane, an action based on the one or more commands (block 540). For example, the master access point (e.g., using processor 320, memory 330, storage component 340, output component 360, communication interface 370, and/or the like) may perform, via the control plane, an action based on the one or more commands, as described above in connection with FIGS. 1A-1E.

Process 500 may include additional implementations, such as any single implementation or any combination of implementations in connection with one or more other processes described elsewhere herein.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
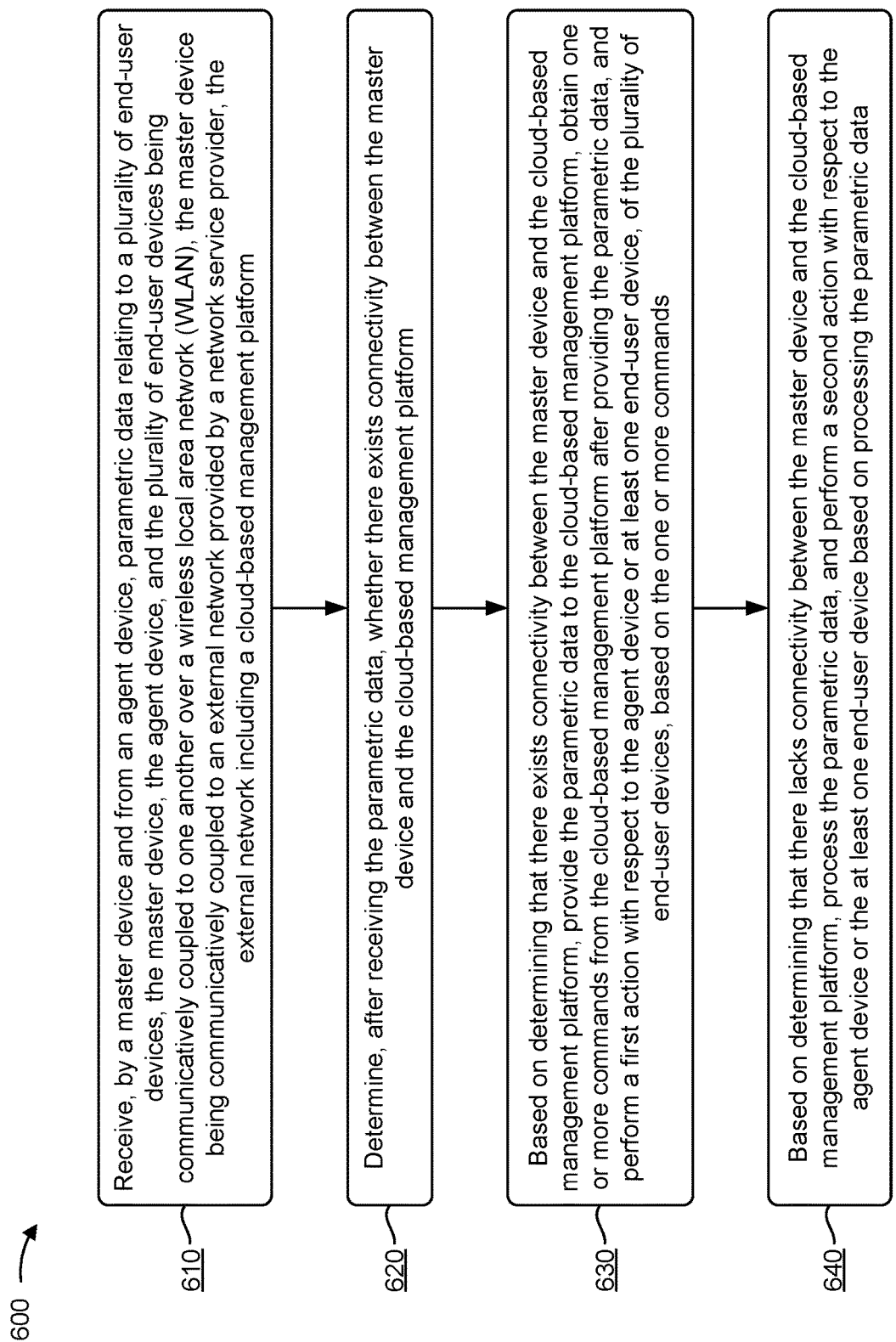
FIG. 6 is a flow chart of an example process for optimizing the performance of a network.

FIG. 6 is a flow chart of an example process 600 for optimizing the performance of a network. In some implementations, one or more process blocks of FIG. 6 may be performed by a master device (e.g., master device 210-1). In some implementations, one or more process blocks of FIG. 6 may be performed by another device or a group of devices separate from or including the master device, such as an agent device (e.g., an agent device 210-2), an end-user device (e.g., an end-user device 210-3), a cloud-based management platform (e.g., management platform 260), hub system 220, transport system 230, edge system 240, core network system 250, and/or network controller 280. In some implementations, a non-transitory computer-readable medium may include instructions. In some implementations, the instructions may include one or more instructions that, when executed by one or more processors of the master device, cause the one or more processors to perform process 600.

As shown in FIG. 6, process 600 may include receiving, from the agent device, parametric data relating to a plurality of end-user devices, the master device, the agent device, and the plurality of end-user devices being communicatively coupled to one another over a wireless local area network (WLAN) (e.g., network 295), the master device being communicatively coupled to an external network (e.g., network 290) provided by a network service provider, and the external network including the cloud-based management platform (block 610). For example, the master device (e.g., using processor 320, memory 330, storage component 340, input component 350, communication interface 370, and/or the like) may receive, from the agent device, parametric data relating to a plurality of end-user devices, as described above in connection with FIGS. 1A-1E. In some implementations, the master device, the agent device, and the plurality of end-user devices may be communicatively coupled to one another over a WLAN. In some implementations, the master device may be communicatively coupled to an external network provided by a network service provider. In some implementations, the external network may include the cloud-based management platform.

As further shown in FIG. 6, process 600 may include determining, after receiving the parametric data, whether there exists connectivity between the master device and the cloud-based management platform (block 620). For example, the master device (e.g., using processor 320, memory 330, storage component 340, and/or the like) may determine, after receiving the parametric data, whether there exists connectivity between the master device and the cloud-based management platform, as described above in connection with FIGS. 1A-1E.

As further shown in FIG. 6, process 600 may include, based on determining that there exists connectivity between the master device and the cloud-based management platform, providing the parametric data to the cloud-based management platform, obtaining one or more commands from the cloud-based management platform after providing the parametric data, and performing a first action with respect to the agent device or at least one end-user device, of the plurality of end-user devices, based on the one or more commands (block 630). For example, the master device (e.g., using processor 320, memory 330, storage component 340, input component 350, output component 360, communication interface 370, and/or the like) may, based on determining that there exists connectivity between the master device and the cloud-based management platform, provide the parametric data to the cloud-based management platform, obtain one or more commands from the cloud-based management platform after providing the parametric data, and perform a first action with respect to the agent device or at least one end-user device, of the plurality of end-user devices, based on the one or more commands, as described above in connection with FIGS. 1A-1E.

As further shown in FIG. 6, process 600 may include, based on determining that there lacks connectivity between the master device and the cloud-based management platform, processing the parametric data, and performing a second action with respect to the agent device or the at least one end-user device based on processing the parametric data (block 640). For example, the master device (e.g., using processor 320, memory 330, storage component 340, output component 360, communication interface 370, and/or the like) may, based on determining that there lacks connectivity between the master device and the cloud-based management platform, process the parametric data, and perform a second action with respect to the agent device or the at least one end-user device based on processing the parametric data, as described above in connection with FIGS. 1A-1E.

Process 600 may include additional implementations, such as any single implementation or any combination of implementations in connection with one or more other processes described elsewhere herein.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Providing end-to-end access point, and device, management throughout a subscriber's in-premises network (e.g., including via device steering and/or load balancing), based on device type, service applications being executed, and/or the like, optimizes device-to-device connections, which improves overall network performance and reliability. Learning of network resource usage patterns, based on parametric data collected over time, also enables continual adjustments to be made to further optimize network performance (e.g., as device behavior changes). Parametric data analyses also allow a network service provider to identify network-related issues, and take appropriate action(s) quickly—including, for example, notifying an affected subscriber and/or technical support teams—to address the issues, which enables more efficient issue resolution and improves overall service reliability.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold can refer to a value being greater than the threshold, more than the threshold, higher than the threshold, greater than or equal to the threshold, less than the threshold, fewer than the threshold, lower than the threshold, less than or equal to the threshold, equal to the threshold, and/or the like.

To the extent the aforementioned embodiments collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A system comprising a management platform, the management platform including one or more memories, and one or more processors communicatively coupled to the one or more memories, the system comprising:
    a first subscriber device,
        the first subscriber device hosting a master system and being communicatively coupled to the management platform; and
    a second subscriber device,
        the second subscriber device hosting an agent system and being communicatively coupled to the first subscriber device, and to an end-user device, over a wireless local area network (WLAN),
        the agent system being configured to cause the second subscriber device to:
            output information regarding the end-user device,
        the management platform being configured to cause the one or more processors to:
            identify, based on the information, an insufficiency in network resource capacity associated with the WLAN, for the end-user device, and
            provide one or more commands to the master system to cause the master system to perform an action to address the insufficiency.

2. The system of claim 1, wherein the information includes parametric data relating to the end-user device; and
    wherein the management platform, when causing the one or more processors to identify the insufficiency, is configured to:
        cause the one or more processors to analyze the parametric data based on a service level agreement (SLA) profile associated with the end-user device.

3. The system of claim 1, wherein the management platform is further configured to cause the one or more processors to:
    process the information, and additional information, regarding the end-user device, obtained over time, to identify network resource usage patterns associated with the end-user device; and
    wherein the management platform, when causing the one or more processors to provide the one or more commands, is configured to cause the one or more processors to:
        provide the one or more commands based on the network resource usage patterns.

4. The system of claim 1, wherein the action includes:
    causing the end-user device to communicate with the second subscriber device over a different channel band of the second subscriber device; or
    causing the end-user device to terminate communications with the second subscriber device, and establish communications with a third subscriber device communicatively coupled to the first subscriber device.

5. The system of claim 1, wherein the insufficiency in network resource capacity relates to:
    interference associated with the second subscriber device; or
    an available network resource capacity, of the second subscriber device, satisfying a threshold.

6. The system of claim 1, further comprising:
    an additional agent system hosted by a third subscriber device,
        the third subscriber device being communicatively coupled to the first subscriber device, the second subscriber device, and an additional end-user device, over the WLAN;
    wherein the additional agent system is configured to cause the third subscriber device to:
        output additional information regarding the additional end-user device; and
    wherein the management platform is further configured to cause the one or more processors to:
        identify, based on the additional information, another insufficiency in network resource capacity for the additional end-user device, and
        provide one or more additional commands to the master system to cause the master system to perform an additional action to address the other insufficiency.

7. The system of claim 1, wherein the master system is instantiated in a container of a first container environment hosted by the first subscriber device; and
    wherein the agent system is instantiated in a container of a second container environment hosted by the second subscriber device.

8. The system of claim 1, wherein the agent system, when causing the second subscriber device to output the information, is configured to cause the second subscriber device to:
    provide the information to the master system; and
    wherein the master system is configured to cause the first subscriber device to:
        provide the information to the management platform to enable the management platform to identify the insufficiency.

9. A method, comprising:
    receiving, by a master access point and from an extender access point, information regarding one or more end-user devices communicatively coupled to the extender access point,
        the master access point being communicatively coupled to an external network,
            the external network including a management platform,
        the master access point and the extender access point being communicatively coupled to one another over an in-premises network,
        the master access point implementing a control plane for controlling the extender access point;
    transmitting, by the master access point, the information to the management platform to cause the management platform to determine a resource allocation adjustment relating to the one or more end-user devices;
    receiving, by the master access point and from the management platform, one or more commands based on the resource allocation adjustment; and
    performing, by the master access point and via the control plane, an action based on the one or more commands.

10. The method of claim 9, wherein the information includes parametric data associated with the one or more end-user devices.

11. The method of claim 10, wherein the parametric data relates to:
- a received signal strength indicator (RSSI);
- airtime availability;
- channel utilization; or
- network latency.

12. The method of claim 9, wherein the management platform, the master access point, and/or the extender access point are configured to determine, and maintain, a score for each end-user device of the one or more end-user devices; and
wherein the action is based on the score for at least one end-user device of the one or more end-user devices.

13. The method of claim 12, wherein the score for an end-user device, of the one or more end-user devices, is based on:
- a strength of a connection between the end-user device and the extender access point;
- a type of traffic that the end-user device is sending and/or receiving;
- a device type of the end-user device;
- security capabilities of the extender access point;
- available airtime on the extender access point;
- channel band occupancy for the extender access point;
- a priority of the end-user device; or
- a load on the extender access point.

14. The method of claim 9, wherein the management platform is implemented in a cloud computing environment on the external network.

15. A non-transitory computer-readable medium comprising instructions, the instructions comprising:
one or more instructions that, when executed by one or more processors of a master device, cause the one or more processors to:
receive, from an agent device, parametric data relating to a plurality of end-user devices,
the master device, the agent device, and the plurality of end-user devices being communicatively coupled to one another over a wireless local area network (WLAN),
the master device being communicatively coupled to an external network provided by a network service provider,
the external network including a cloud-based management platform;
determine, after receiving the parametric data, whether there exists connectivity between the master device and the cloud-based management platform;
based on determining that there exists connectivity between the master device and the cloud-based management platform:
provide the parametric data to the cloud-based management platform,
obtain one or more commands from the cloud-based management platform after providing the parametric data, and
perform a first action with respect to the agent device or at least one end-user device, of the plurality of end-user devices, based on the one or more commands; and
based on determining that there lacks connectivity between the master device and the cloud-based management platform:
process the parametric data, and
perform a second action with respect to the agent device or the at least one end-user device based on processing the parametric data.

16. The non-transitory computer-readable medium of claim 15, wherein the parametric data relates to:
- packet loss;
- throughput;
- a received signal strength indicator (RSSI);
- airtime availability;
- channel utilization; or
- network latency.

17. The non-transitory computer-readable medium of claim 15, wherein the master device includes a master access point or a router; and
wherein the agent device includes an extender access point.

18. The non-transitory computer-readable medium of claim 15, wherein the first action or the second action includes:
causing the at least one end-user device to establish communications with the agent device over a different channel band of the agent device.

19. The non-transitory computer-readable medium of claim 15, wherein the first action or the second action includes:
causing the at least one end-user device to establish communications with another agent device communicatively coupled to the master device.

20. The non-transitory computer-readable medium of claim 15, wherein the one or more instructions, that cause the one or more processors to process the parametric data, cause the one or more processors to:
process the parametric data based on at least one service level agreement (SLA) profile associated with the plurality of end-user devices.

* * * * *